331-98
SEARCH ROOM
July 4, 1950 A. HORVATH 2,513,324
SINGLE TUNED CIRCUIT ULTRA HIGH FREQUENCY OSCILLATOR
Filed April 19, 1947
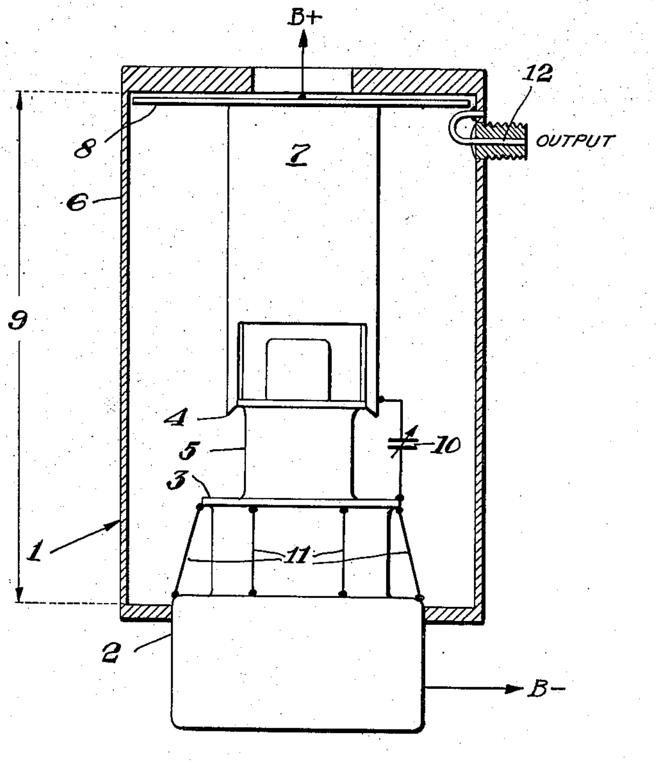
INVENTOR.
ALEXANDER HORVATH
BY
RP Morris
ATTORNEY
742678

Patented July 4, 1950

2,513,324

UNITED STATES PATENT OFFICE 2,513,324

SINGLE TUNED CIRCUIT ULTRA HIGH FREQUENCY OSCILLATOR

Alexander Horvath, Clifton, N. J., assignor to Federal Telecommunication Laboratories, Inc., New York, N. Y., a corporation of Delaware Application April 19, 1947, Serial No. 742,678

4 Claims. (Cl. 250—36)

This invention relates to oscillators and particularly to an arrangement utilizing lumped circuits for providing the necessary feedback to sustain oscillation at ultra high frequencies.

At low frequencies wherein lumped circuit parameters may be used, it is customary to construct oscillators with but one tuned circuit from which a small portion of the power is fed back to the input to sustain oscillation. A classic example is the Hartley type circuit. However as the frequency range is extended into the ultra high frequency region, distributed circuit parameters in the form of resonant cavity arrangements are utilized, such as wave guides or coaxial lines. In the case of tuned-plate tuned-cathode oscillators, feedback is accomplished by means of frequency critical devices such as a loop or probe inserted between cavity sections. A still more critical device sometimes utilized is the grid bell, which adds a third tuned element to the circuit. All of these methods require the observance of very close tolerances during manufacture of the oscillator circuit components and results in a high cost of the finished product.

An object of this invention is to provide an oscillator for the ultra high frequency region utilizing a simple feedback circuit.

In accordance with an embodiment of the invention an oscillator circuit is provided comprising an electron discharge device, and a cavity resonator is provided between the anode and cathode electrodes of the electron discharge device. To sustain oscillations in the oscillator circuit, electrically conductive elements, having dimensions short with respect to the operating wavelength of said oscillator, are provided between the grid electrodes and the cathode electrodes of the device and within the cavity resonator. The necessary coupling is thus provided between the conductive elements and the resonator.

The above mentioned and other features and objects of this invention will become more apparent and the invention itself, though not necessarily defined by said features and objects, will be best understood by reference to the following description of an embodiment of the invention taken in connection with the accompanying single figure drawing, which illustrates an oscillator circuit arrangement in accordance with the present invention.

Referring to this single figure, an oscillator tube 1 is provided of the type comprising cathode, grid and plate electrodes 2, 3 and 4 respectively, each having a substantially disc-like structure sealed across a glass envelope 5 and closely spaced to minimize inter-electrode capacity. This type of tube is commonly referred to as a "light house" tube. In the usual operation of this tube as an oscillator, the tuning circuit for tuning the oscillator to resonance consists of three concentric cylinders forming two concentric cavity resonators. One of the cavity resonators being coupled between the cathode and grid electrodes, and the other cavity resonator being coupled between the grid and plate electrodes. Probes are usually provided for coupling energy from one cavity resonator to the other in order to provide the required feedback energy to sustain oscillations. It can be readily appreciated that the manufacture of such an arrangement requires the observance of strict tolerances. In order to simplify the oscillator circuit the following arrangement is provided.

As shown in Fig. 1, the tuner for the oscillator circuit consists of two concentric cylinders 6 and 7 effectively short circuited at one end 8 for the oscillation frequency and forming a cavity resonator coupled between the plate and cathode electrodes of the electron discharge device 1. A distance 9 is varied to adjust the resonant frequency of the cavity resonator. A small tuning condenser 10 may be coupled between the plate and grid electrodes 4 and 3 respectively for fine tuning of the cavity resonator. To sustain oscillations, the necessary feedback is provided by electrical conductors 11, having dimensions short with respect to the operating wavelength of the oscillator circuit, and coupled between the grid and cathode electrodes of the electron discharge device within the cavity resonator formed by cylinders 6 and 7. By short elements it is meant that only a very small difference in voltage or current will be noted along the length of the elements. This will in general be lengths of one tenth wavelengths or less. In a particular test model, several strips of ⅜ inch #24 SAE wire were spaced about the periphery of the disc-like electrodes and conductively soldered thereto for providing the necessary feedback energy. A simple output coupling device 12 is provided for removal of the oscillator energy. The high voltage may be applied to the anode electrode 4 by direct coupling to the inner cylinder 7 as shown. The separation between the portions of the cylinders 6 and 7 effectively forming a blocking condenser for the high direct voltage while effectively being a short circuit for the oscillatory frequency energy.

By means of this arrangement oscillations have been produced in the range of 1000 megacycles per second with a "light house" type tube with very satisfactory efficiency. Furthermore satisfactory operation has been achieved by means of a comparatively less critical and more simplified circuit arrangement than has heretofore been known.

While I have described above said features and objects of my invention in connection with specific apparatus and particular modification thereof, it is to be clearly understood that this description is made only by way of example and not as a limitation of the scope of my invention.

What is claimed is:

1. An oscillator circuit comprising an electron discharge device having anode, cathode, and grid electrodes, a cavity resonator coupled between the anode and cathode electrode, and an electrical conductor strip, having a length substantially less than a quarter wavelength at the operating wavelength of said oscillator, connected directly between said grid electrode and cathode electrode outside said device within said resonator.

2. An oscillator circuit comprising an electron discharge device, the device having cathode, control grid and plate electrodes, the cavity resonator coupled between said cathode and plate electrode, a given number of metallic conductors, having a length substantially less than a quarter wavelength at the operating wavelength of the oscillator circuit directly conductively connected between said grid electrode and said cathode electrode outside said device within said cavity resonator for providing the necessary feedback to sustain oscillation within said oscillator circuit.

3. An oscillator circuit of the type utilizing an electron dscharge device comprising a coaxial transmission line coupled at one end between the anode and cathode electrodes of said device and effectively short circuited at the other end substantially a quarter wavelength distance at the system mean operating frequency, and means for sustaining oscillations in said oscillator circuit comprising a given number of spaced, substantially thin metallic wires having a length substantially less than a quarter wavelength at said system mean operating frequency coupled between the grid and cathode electrodes of said device outside said device within the chamber formed by said coaxial line.

4. An arrangement as set forth in claim 3, further comprising an adjustable lumped capacitor coupled between said grid and anode electrodes for tuning said oscillator circuit.

ALEXANDER HORVATH.

REFERENCES CITED

The following references are of record in the file of this patent:

UNITED STATES PATENTS

| Number | Name | Date |
|---|---|---|
| 2,107,387 | Potter | Feb. 8, 1938 |
| 2,423,443 | Fay | July 8, 1947 |
| 2,428,609 | Beggs | Oct. 7, 1947 |